R. C. Blunt,
Grain Drill.
No. 95,073. Patented Sep. 21, 1869.

Witnesses:
Inventor:

United States Patent Office.

HIRAM BLUNT AND ROBERT C. BLUNT, OF BATH, ILLINOIS, BY HIRAM BLUNT FOR HIMSELF, AND HIRAM BLUNT AND MARY JANE BLUNT, EXECUTORS OF ROBERT C. BLUNT, DECEASED.

Letters Patent No. 95,073, dated September 21, 1869.

IMPROVEMENT IN WHEAT-DRILLS.

The Schedule referred to in these Letters Patent and making part of the same

*To all whom it may concern:*

Be it known that ROBERT C. BLUNT, deceased, and HIRAM BLUNT, of Bath, in the county of Mason, and State of Illinois, have made certain new and useful Improvements in Wheat-Drills; and we, HIRAM BLUNT and MARY JANE BLUNT, as executors of the last will and testament of said ROBERT C. BLUNT, deceased, and HIRAM BLUNT, all of the place aforesaid, do hereby declare the following to be a full and true description thereof, reference being had to the accompanying drawings, and to the letters of reference marked thereon.

In the construction of the said wheat-drill, the seed-box rests upon the cutters or plows, and the draught-team is attached to the frame-work formed by said parts.

In the rear of said frame is hinged a second frame, supported also upon covering-rollers in said frame.

For the purpose of adjusting the depth to which the cutters enter, the nature of our invention is in the arrangement of a hinged seat and a foot-rest in suchwise that the operator or driver upon the seat shall be able to gauge the cutter-depth by the use of foot-power to support more or less of the weight of the feed-box and its frame upon the rollers.

Secondly, to form a more perfect feeding-device, the nature of said invention is in the arrangement of a seed-feeding screw with the seed-box and seed-tubes, in the specific manner hereinafter described.

To enable those herein skilled to make and use our said improvements, we will now more fully describe the same, referring herein to the accompanying—

Figure 1:
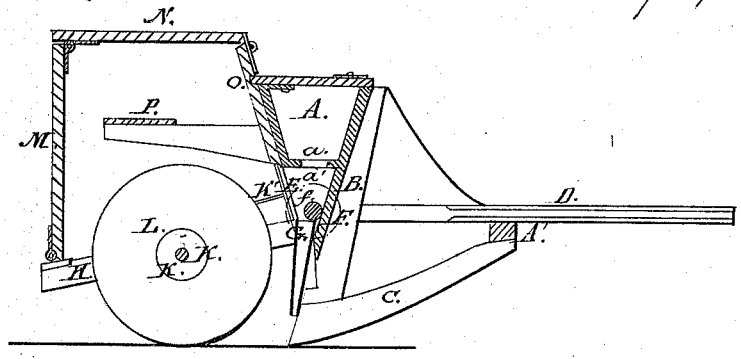

Figure 1 as a sectional elevation, to

Figure 2:
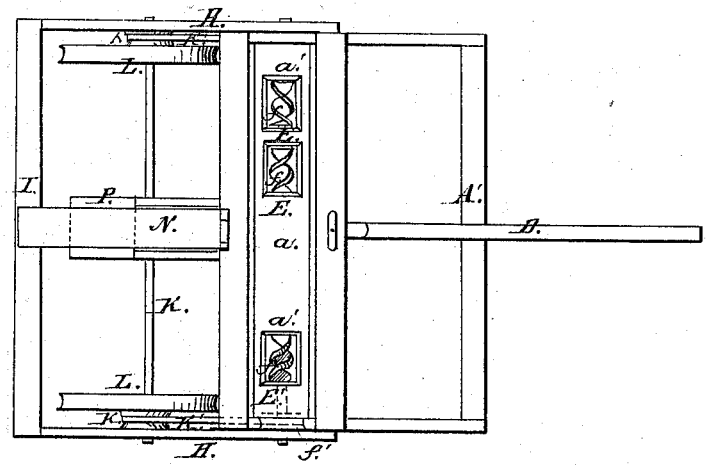

Figure 2 as a top view, and

Figure 3:
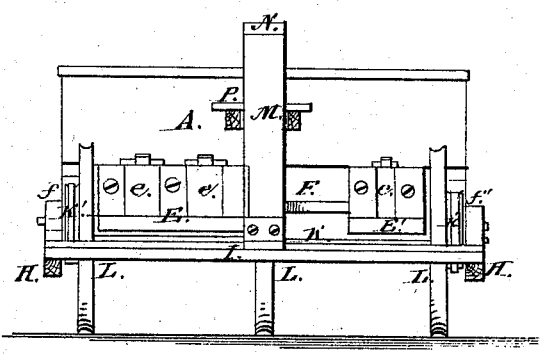

Figure 3 as a rear end view of the drill, in such form as to exhibit the separate features of this invention.

We arrange the seed-box A in about the usual form for containing the grain to be planted.

Connected with the bottom thereof is the standard B, which supports the rear end of the cutter C or plow.

The forward end of said cutter is held upon the transverse bar A' connected with the seed-box frame.

The tongue D is attached to the box A, and passes over the bar A', connecting suitably therewith.

The cutters or plows here used will be of suitable form to open a furrow for the grain, being shaped generally as indicated in the figures.

The seed-box A has the bottom board a, in which are the seed-openings a' leading to the feed-boxes E E'. Said boxes are arranged double, as at E, except when an odd cutter or seed-tube is to be supported.

Usually there are seven seed-tubes; hence, in our said drill, there will generally be three double boxes E, and one single box E'.

In said box is arranged the feed-shaft F, having the screws f arranged to move or feed the grain forward or backward out of the boxes E E' to the seed-tubes G; said tubes being vertically under the discharge-opening in the said feed-boxes, and acting to deposit the grain in the furrow made by the cutters.

In the double boxes E the screws f are then right and left inclined, as indicated in fig. 2, thus giving the proper space between the furrows and sown grain.

In order that the feed-screws f shall not clog by straw, or dust, or other impurities, we arrange at the rear of the boxes E E' the sildes e, which may be readily raised, thus affording ingress to cleanse the said boxes when desirable.

To the box-frame A, we hinge the bars H, which are joined at their rear ends by the cross-piece I.

Said bars H sustain the roller-shaft K, on which are arranged the rollers L, being placed to cover the furrow of each cutter C.

On said shaft K are furthermore the pulleys k, connecting, by belts or bands k', with pulleys f' upon the screw-shaft F, so that the movement of the roller-shaft K causes the feed-screws to revolve.

Upon the bar I, we arrange, by a hinged joint, the seat-standard M, connecting with the seat-board N, this being again hinged, as shown in fig. 1, with the front standard O, secured to the seed-box A.

Beneath the seat-board, and within reach of the feet of the operator, we arrange the foot-rest P, connected securely to the seed-box A.

The driver, sitting upon the board N, may then, by pressing the foot-rest P down, raise the seed-box frame and its cutters C to a higher angular position, or, by releasing pressure, he may drop the said parts to a lower angular position, thereby giving the cutters a greater or less tendency to enter the ground, and gauging their depth. At the same time, as, by said construction, the weight of the driver is well balanced upon the rollers I, the draught of the machine is much reduced, and the operation of covering the grain in the furrow is made all the more effective.

Having thus fully described the said invention,

What is claimed, is—

1. The seed-box A and feed-boxes E E', when arranged with slides e and the feed-screws f, substantially as set forth.

2. The hinged support given to the driver upon the roller-frame, and the foot-rest connected with the seed-box frame, when combined to be operated substantially as set forth.

In witness whereof, we have hereunto set our hands, in the presence of—

HIRAM BLUNT,
MARY J. BLUNT,
*Executors of the last will and testament of Robert C. Blunt, deceased.*
HIRAM BLUNT.

Witnesses as to HIRAM BLUNT:
GEORGE P. HERTHEL, Jr.,
WILLIAM W. HERTHEL.
Witnesses as to MARY JANE BLUNT:
G. G. BLUNT,
THOS. R. BLUNT.